United States Patent
Lee et al.

(10) Patent No.: US 10,849,074 B2
(45) Date of Patent: Nov. 24, 2020

(54) TERMINAL AND OPERATING METHOD THEREOF

(71) Applicant: FCI Inc., Gyeonggi-do (KR)

(72) Inventors: Sang Joon Lee, Gyeonggi-do (KR); Chong Hoon Lee, Gyeonggi-do (KR); Chang Hawn Park, Gyeonggi-do (KR); Won Man Kim, Gyeonggi-do (KR)

(73) Assignee: Dialog Semiconductor Korea Inc., Seoul (KR)

( * ) Notice: Subject to any disclaimer, the term of this patent is extended or adjusted under 35 U.S.C. 154(b) by 0 days.

(21) Appl. No.: 16/153,354

(22) Filed: Oct. 5, 2018

(65) Prior Publication Data
US 2019/0182768 A1    Jun. 13, 2019

(30) Foreign Application Priority Data
Dec. 13, 2017  (KR) ................. 10-2017-0170885

(51) Int. Cl.
*H04W 52/02* (2009.01)
*H04L 29/12* (2006.01)
*H04L 12/935* (2013.01)
*H04W 76/25* (2018.01)

(52) U.S. Cl.
CPC .......... *H04W 52/028* (2013.01); *H04L 49/30* (2013.01); *H04L 61/256* (2013.01); *H04L 61/2514* (2013.01); *H04W 52/0241* (2013.01); *H04W 76/25* (2018.02); *H04L 61/2007* (2013.01)

(58) Field of Classification Search
CPC ........... H04W 52/028; H04W 52/0241; H04W 76/25; H04L 61/2007; H04L 61/256; H04L 49/30
See application file for complete search history.

(56) References Cited

U.S. PATENT DOCUMENTS

| | | | |
|---|---|---|---|
| 8,077,657 B2* | 12/2011 | Venkatachalam | H04W 76/25 370/328 |
| 9,351,253 B2* | 5/2016 | Chhabra | H04W 48/20 |
| 2003/0128676 A1* | 7/2003 | Lee | H04L 12/2856 370/328 |
| 2009/0210485 A1* | 8/2009 | Dunk | H04L 67/14 709/203 |
| 2016/0323620 A1* | 11/2016 | Kim | H04N 19/423 |
| 2017/0215143 A1* | 7/2017 | Fiennes | H04W 52/028 |
| 2018/0063789 A1* | 3/2018 | Chen | H04L 12/12 |

FOREIGN PATENT DOCUMENTS

CN          201867678 U    6/2011

* cited by examiner

*Primary Examiner* — Rasheed Gidado
(74) *Attorney, Agent, or Firm* — Saile Ackerman LLC; Stephen B. Ackerman

(57) ABSTRACT

A terminal includes a first storage, which is kept turned on in a sleep mode, and is utilized to store a first packet transmitted with a server, a second storage which is utilized to store data required for the terminal in a wake-up mode, a central processing unit which is utilized to generated a second packet according the first packet and send the first packet to a access point in the sleep mode, and a communication unit which is connected to the access point and is utilized to transmit the second packet according to control of the central processing unit.

8 Claims, 3 Drawing Sheets

TERMINAL AND OPERATING METHOD THEREOF

FIELD OF INVENTION

The present disclosure relates to a terminal and an operational method thereof, and more particular to an operational method for a wireless terminal to transmit and receive packet when the wireless terminal is in sleep mode.

BACKGROUND OF INVENTION

Network address translation (NAT) technology can assign private addresses for a plurality of nodes managed by a router. The router can provide internet service for plurality of devices (node) only using an internet protocol (IP) address. Therefore, in comparison to a conventional internet protocol, which can only assign a public IP address to one device, NAT allows a plurality of sharing nodes share the same public IP address. In the meanwhile, NAT can use the internal address and protect the internal private address from accessing by public (such as public internet).

NAT devices usually have a counter to determine whether registered accesses have not been used over a predetermined period or not according to input and output flow bytes (that is, the NAT devices are "over-time"). If there is no input or output data flow through the registered accesses, the registered information of the accesses will be deleted. Thus, the deleted accesses cannot provide connections to the private network of the NAT devices anymore unless the sharing access is re-established. In order or prevent that the counter determines the NAT device is "over-time", "keep-alive" and "heartbeat" mechanisms are utilized. The "keep-alive" mechanism resets the counter by the period which is shorter than the predetermined period in order to keep the access in using condition. However, extra data flow is generated in "keep-alive" mechanism. For portable devices (such as smart phone) which use batteries as the main power source, the conventional "keep-alive" mechanism requires extra wireless data flow which makes the available usage time become shorter because the power consumption become higher due to the extra data flow.

SUMMARY OF INVENTION

The object of the present disclosure is providing an operational method to keep the communication access between a wireless terminal and a network access translation (NAT) device by transmitting data with a server through an internet protocol (IP) address so that the power consumption can be reduced.

The present disclosure provides a terminal and includes a first storage, a second storage, a central processing unit and a communication unit. The first storage stores a first packet transmitted with a server and the power of the first storage is on in a sleep mode. The second storage stores data required for the terminal in a wakeup mode. The power of the second storage is off in the sleep mode. The central processing unit generates a second packet for keeping the access between the terminals and an access point according to the first packet and periodically transmit the second packet to the access point. The communication unit is connected to the access point and transmits the second packet according to the control from the central processing unit.

The present disclosure further provides an operational method of a terminal including storing a first packet transmitted with a server into a first storage, storing data required for the terminal in a wake-up mode into a second storage, generating a second packet for keeping a access between a access point and the terminal in a sleep mode, and periodically transmit the second packet to the access point. The power of the first storage is on when the terminal is in the sleep mode. The power of the second storage is off when the terminal is in sleep mode.

The above-mentioned terminal and operational method of the present disclosure make the wireless terminal keep the connection with the NAT device by using minimum power consumption in sleep mode. Therefore, the required power is minimalized and the access can keep communication between the wireless terminal and the NAT device even the wireless terminal is in sleep mode.

DETAILED DESCRIPTION OF PREFERRED EMBODIMENTS

The following context practically introduces parts of embodiments of the present disclosure accompanying with exemplifying drawings. It should be understood that the same reference numbers refer to the same components may be used in different drawings. If structures or functions of a component are well-known will not result in confusion even without any illustration, the detailed introduction will be omitted.

The terms first, second, A, B, (a), (b) are utilized to distinguish different components instead of limiting the arrangements or orders of the embodiments. When components are "comprised" or "included", it means the composition may include components which are not mentioned, that is, the composition is not exclusively composed by the mentioned components. Terms "unit", "module", etc. refer to a component which has at least one function or can deal with at least one process. The component can be hardware, software of the combination of hardware and software.

Wireless terminals will turn off the internal power to reduce power consumption and turn on the power only when operation requires. Therefore, if the terminals are in sleep mode in a long time, the mapping information will be deleted due to over-time and the access which is utilized to transmit data between the terminal and server will disappear. Therefore, the present disclosure provides a method to keep the transmit access between the wireless terminals and server by keep transmitting packets even the wireless terminal is in sleep mode.

Figure 1:
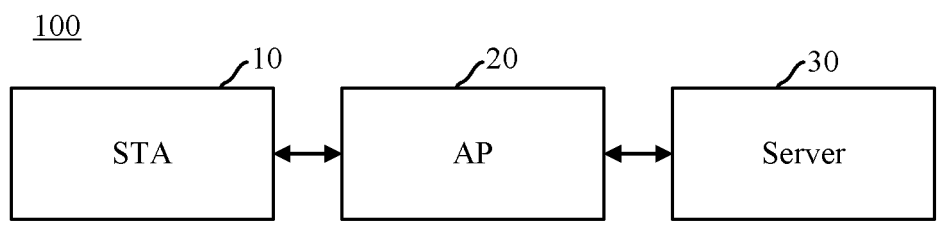
FIG. 1 is a block diagram of wireless communication system of the present disclosure.

FIG. 1 illustrates a block diagram of the wireless communication system of the present disclosure. The wireless communication system 100 includes station (STA) 10, access point (AP) 20 and server 30. The STA 10 can be a wireless terminal.

STA 10 has WIFI interface for establishing WIFI communication and receiving private internet protocol (IP) address from AP 20 so that the STA 10 is capable to be connected with internet. STA 10 further operates in sleep mode for reducing power consumption if required.

In an embodiment of the present disclosure, STA 10 can be a wireless communication terminal, smart phone, laptop, personal computer or any portable devices which are able to transmit data with an AP in a wireless network.

AP 20 replays the communication between STA 10 and server 30. AP 20 has network address translation (NAT) technology thus can assign private IP addresses for a plurality of STAs 10. AP 20 can map a plurality of private IP addresses to one public IP address. Therefore, AP 20 can establish communication between the plurality of STAs 10 and internet even when only one public IP address is provided by internet service provider (ISP). AP 20 takes the response to transmit a packet receiving request, which is sent by STA 10, to the server 30, and also takes the response to transmit data from server 30 to STA 10 when the packet receiving request is received.

In the embodiment of the present disclosure, AP 20 is a device having NAT technology. AP 20 manages the accesses between the STAs 10 and server 30 by using NAT technology, mapping information and an over-time counter. AP 20 stops the over-time counter and deletes registered information regarding the STA 10 which has not operated over a predetermined period in the purpose of optimization of managing the mapping information between the STAs 10 and AP 20. After the registered information on AP 20 is deleted, the corresponding STA 10 is no longer able to receive a packet from server 30 even when the server 30 transmits data upon request because the registered access between the AP 20 and the STA 10 is deleted. Therefore, in order to keep the access between the STAs 10 and the AP 20, packets are required to transmit by a period shorter than the predetermined period so that the connections between the STAs 10 and the AP 20 are kept alive.

The server 30 checks whether the public IP of the AP 20 belongs to pre-registered public IP. That is, the server 30 checks whether the AP 20 is serving clients or not and transmits packets to STAs 10 when the AP 20 is the serving AP.

Figure 2:
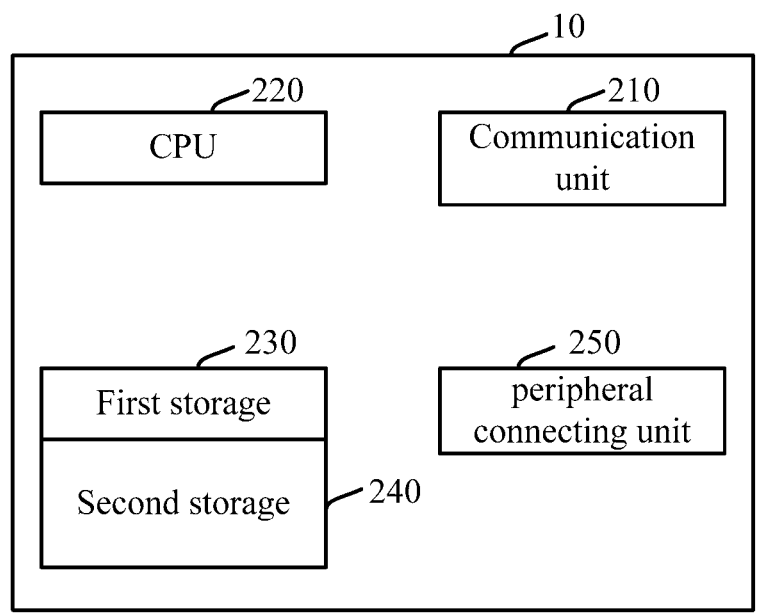
FIG. 2 is a block diagram of station (STA) of the present disclosure.

FIG. 2 illustrates a block diagram of the STA of the present disclosure. The STA 10 of the present disclosure includes a communication unit 210, a central processing unit (CPU) 220, a first storage 230, a second storage 240 and a peripheral connecting unit 250.

The communication unit 210 is configured to execute near-field communication with communication units of other devices. The near-field communication includes WIFI, BLUETOOTH, ZIGBEE, and other near-field communication protocol. Therefore, the communication unit 210 possesses a radio frequency (RF) receiving-and-transmitting unit to transmit and receive RF signals for executing near-field communication. The communication unit 210 can further include an analog-to-digital converter (ADC) or a digital-to-analog converter (DAC) to convert received analog signals into digital signals, or convert received digital signals into analog signals. Furthermore, the communication 210 can include a modem or media access control unit. The modem allows STAs 10 to be connected to an internal wireless communication environment, and allows STAs 10 to receive and transmit data with internet, or communicate with internet. The media access control unit is utilized to prevent STAs from signal distortion and efficiently process receiving and transmitting data to STAs which shared the same public IP address. The power of communication 210 will be kept on in order to periodically transmit packets to AP 20 to keep the communication access between the STA 10 and AP 20 alive even when the STA 10 is in sleep mode.

The CPU 220 controls all the components including STA 10. More particularly, the CPU 220 verifies protocols of communications or connections between the communication unit 210 and communication unit of other devices when STA 10 wakes up from sleep mode. Besides, CPU 220 also controls the connections between communication unit 210 and other devices (such as AP 20) when STA 10 is in sleep mode.

The first storage 230 keeps operating even when STA 10 is in sleep mode. The first storage 230 stores a first packet which is transmitted with the server at the first time. The first storage 230 generates a second packet, which has minimum bytes for keeping communication accesses with server 30, according to the first packet.

The second storage 240 stores all the data required when STA 10 is in wake-up mode, such as launching codes operation system images, application functions, etc. The second storage 240 can be any kind of non-volatile memory so that the data stored in the second storage 240 will not be affected by the power-off of the communication unit 210 and CPU 220.

The peripheral connecting unit 250 is configured to connect the STA 10 with other peripheral devices, i.e., STA 10 connects to other peripheral devices through the peripheral connecting unit 250.

The STA of the present disclosure can be, but not limited to be, a wireless terminal. STA 10 can also in pattern of wireless communication chips or apparatus equipping with communication chips.

Figure 3A:
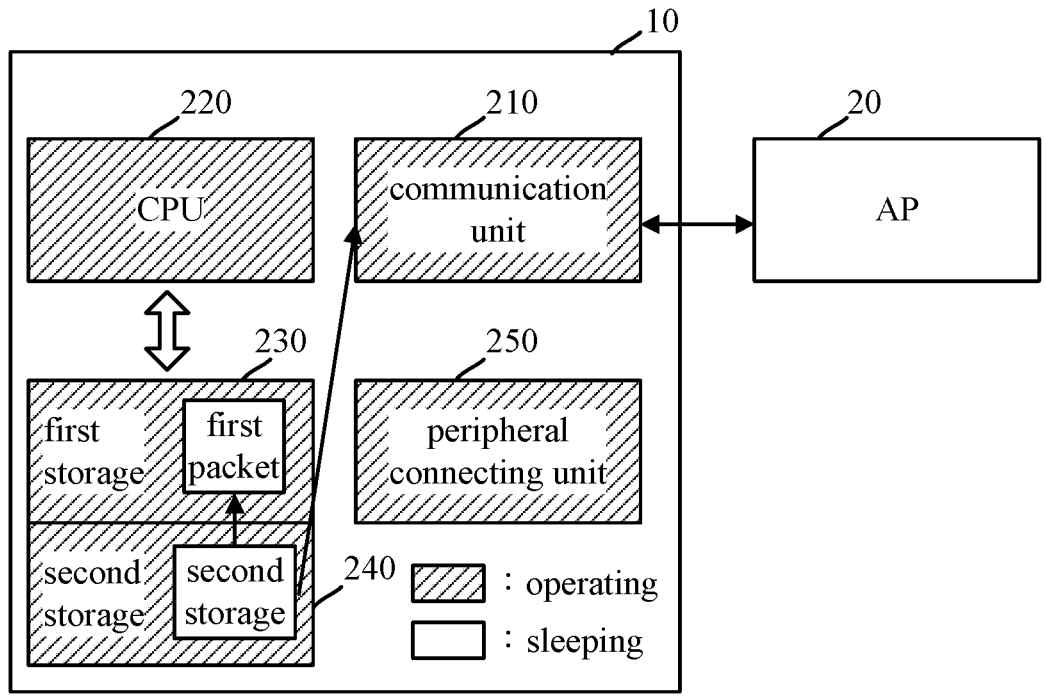
FIG. 3A and FIG. 3B are blocks diagrams respectively illustrate wake-up mode and sleep mode of the STA of the present disclosure.

FIG. 3A illustrates the situation that the STA is in wake-up mode and is able to operating communication.

CPU 220 executes booting process to initialize the components within STA 10 when STA 10 receives an external wake-up signal. After the STA 10 wakes up, the CPU executes cold boot, and all of the components are initialized, and the communication unit 210 keeps in connected status due to the connectivity processes with the communication units of other devices. The connectivity processes refer to that the communication unit 210 comprehensively analyzes receiving sensitivity, number of STAs connected with AP, flowing data and provides the most efficient associations between the STAs and AP.

In addition, the communication unit 210 can proceed to verify process during the connecting process with the other devices if needed. For example, the communication unit 210 of the STA 10 allows the other devices to connect through the AP 20 only when the international mobile subscriber identities (IMSIs) or other kind of identifications of the other devices are viewed as client terminals.

In wake-up mode, the second storage 240 turns on the power to store the data packet transmitted with the server. The second storage 240 stores both the temporary data and result data which are generated during the operating processes of the STAs. The second storage 240 can also store packets for keeping the connection between the STAs and AP. In this situation, the packets, which are transmitted with the server at the first time, are copied and stored into the first storage 230 so that the above-mentioned operations for keeping the access can be executed when STA is in sleep mode.

Figure 3B:
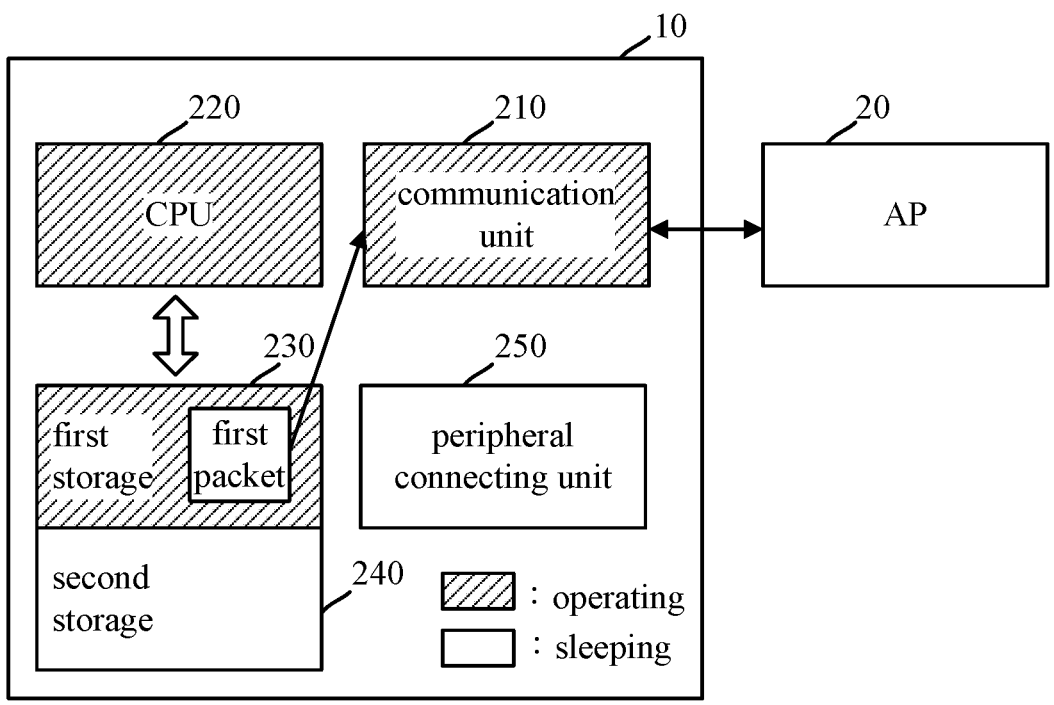

FIG. 3B (B) illustrates the block diagram of the STA in sleep mode.

As shown in FIG. 3B (B), in sleep mode, the power of all components of STA 10 will be turned off except the communication unit 210, the CPU, and the first storage 230. In other words, the embodiment of the present disclosure turns off all of the components including the second storage 240 except the communication unit 210, the CPU, and the first storage 230.

When STA 10 is in sleep mode, the CPU 220 controls the packet transmission for keeping the accesses between the communication 210 and other devices alive. The CPU 220 periodically transmits the packets stored in the first storage 230 to the AP 20 so that the access between STA 10 and AP 20 will not break. Due to the periodical transmission of the packets, the server 30 can transmit data packets to STA 10 in real time domain. The packets transmitted in sleep mode are generated according to the protocol between STA 10 and the AP 20 instead of protocol stack. That is, the CPU 220 utilizes the format of the near-field communication protocol, which is used by the STA 10 and AP 20, to generate packets, and transmits the generated packets to the AP 20 through the communication unit 210.

The first storage 230 stores the packets which the STA 10 transmitted with the server 30 at the first time. The first storage generates a data packet which has the minimum byte to include only the necessary information, such as destination IP address or port, for keeping the access between the STA 10 and AP 20 alive.

In the embodiment of the present disclosure, not all of the storages are supplied power. Instead, power is only supplied to those storages required to the operation of keeping access between AP and STA alive. Thus the power consumption will be minimized.

Figure 4:
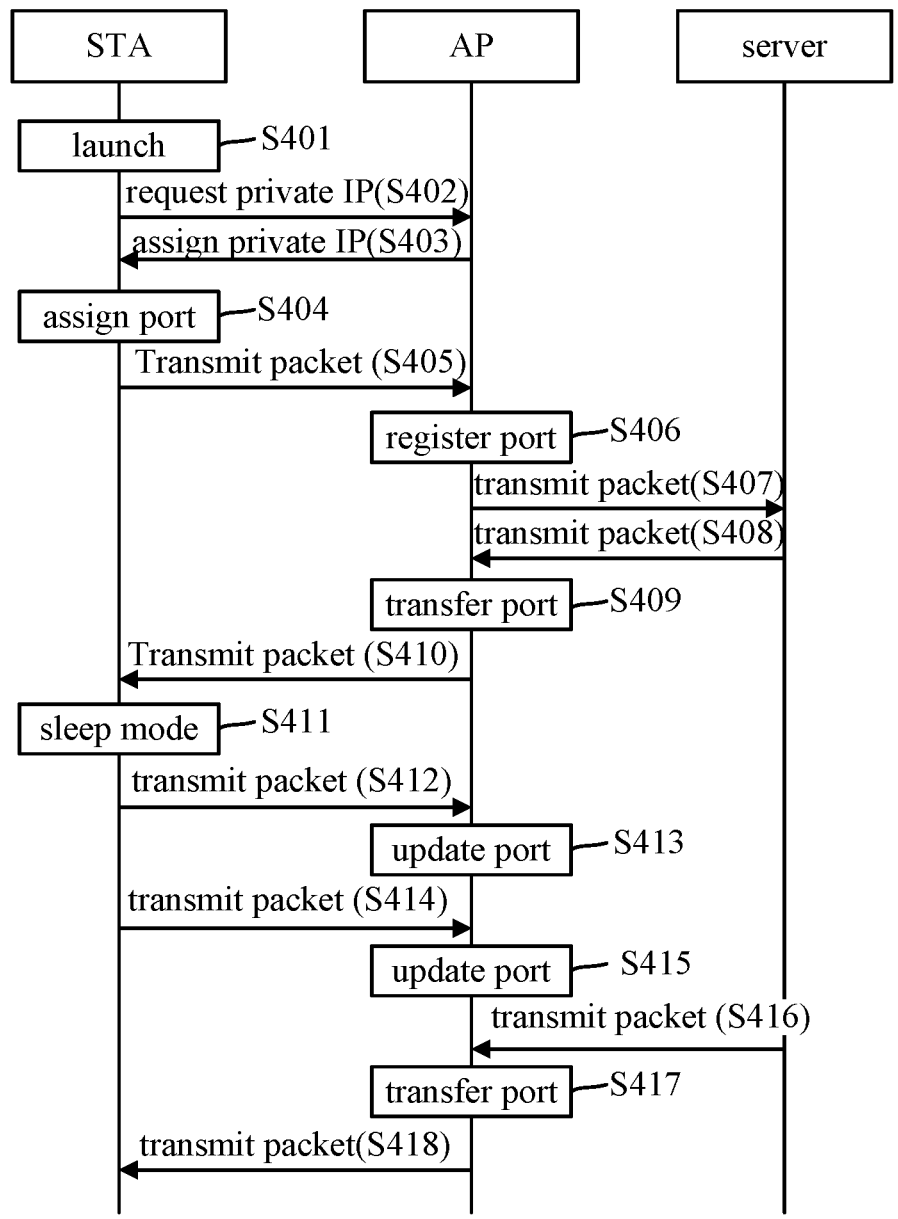
FIG. 4 is a flowchart of packets transmission of the present disclosure when the STA is in sleep mode.

FIG. 4 illustrates the flowchart of the packet transmission when the STA is in sleep mode.

While the power of STA is turned off in sleep mode, STA can receive an external wake-up mode through general purpose input output (GPIO) interface. Alternatively, STA can wake up by a real-time clock at a pre-set time. The CPU launches the STA and initializes all of the components within the STA (S401). Herein, the initialization is performed on all of the components within the STA except the CPU, the communication unit, and the first storage when the STA wakes up from sleep mode. The power will be supplied to all of the components of the STA after initialization. The communication unit may proceed to verify process when connecting to other devices if needed.

More particularly, STA requests AP to assign a private IP (S402) and receives the assigned private IP (S403). NAT technology refers to the IP arrangement method that AP receives a public IP and assigns a plurality of private IP to STAs. Therefore, the AP runs in NAT mode becomes a router for connecting different network. After receiving the assigned IP, STA arranges ports (S404). STA sends the ports arrangement information and the data packets, which STA desires to transmit to the server, to the AP (S405). After receiving the data packets sent by STA, AP register ports (S406) and transmit the data packets to the server (S407). STA connects to the wireless communication network through the private IP assigned by the AP and further connects to public internet by the public IP which the AP receives. AP utilizes the public IP to communicate with other APs located in other networks via the public internet.

The server send data packets, which the server desires to transmit to the STA, to the AP (S408). AP processes a port forwarding process which means AP analyzes which port should receive the data packet from server (S409), and transmits the data packets from server to the corresponding port (S410).

Subsequently, the STA will operate in sleep mode if there is no execution operated in a predetermined period (S411), and then the power of all of the components, except the CPU, the first storage, and the communication unit, will be turned off. That is, power is kept supplying to the CPU, the first storage, and the communication unit while other components are turned off.

When the STA 10 is in sleep mode, STA transmits data packets to the AP in order to keep the connecting access between the STA and the AP (S412). The STA can periodically transmit this kind of over-time prevention packet (S412, S414) to update ports in order to avoid over-time of mapping chart (S413, S415). Because all of the components of the STA are turned off in sleep mode except the CPU, the first storage, and the communication unit. As a result, power is only supplied to the CPU, the first storage, and the communication unit during the processes S412-S415. Only the packets for preventing the access between the STA and the AP from disconnection will be transmitted.

The STA and the server can keep communication because the access between the STA and AP still alive resulted from the packet transmission during S412-S415. In addition, power is supplied to a minimum number of components instead of being supplied to all of the components of the STA. Therefore, the power consumption will be minimized when the STA is in sleep mode even when the communication between the STA and the server is kept going on.

Besides, when receiving data packets from server (S416), AP can analyze which ports should the packets be transmitted to (S417), and then AP send the data packet from the server to the corresponding STA (418).

To conclude, the above-mentioned embodiments are utilized to exemplify rather than limit the technology concept of the present disclosure. Any modification and variation which can be completed by a skilled person in the art on the basis of the specification should fall into the scope of the claims protected by the present disclosure.

What is claimed is:

1. A terminal, comprising:
   a first storage configured to store a first packet transmitted with a server, wherein the first storage remains accessible when the terminal is both in a sleep mode and a wake-up mode;
   a second storage configured to store data required to wake-up the terminal, wherein the second storage is turned off when the terminal is in the sleep mode;
   a central processing unit (CPU) configured to generate a second packet utilized to keep connection between a terminal and an access point (AP), and configured to periodically transmit the second packet to the AP; and
   a communication unit, connected with the AP, and configured to transmit the second packet according a control signal from the CPU,
   wherein the first packet is copied from the second storage when the terminal is in the wake-up mode, and the second packet is generated according to the first packet in the first storage, so that the connection between the terminal and the AP is kept when the terminal is in the sleep mode through the second packet.

2. The terminal according to claim 1, wherein the CPU stores the first packet in the first storage when the terminal receives the first packet from the server at a first time.

3. The terminal according to claim 1, where the second packet comprises a destination internet protocol address and port information.

4. The terminal according to claim 1, wherein the CPU generates the second packet according to a communication protocol between the terminal and the AP.

5. An operational method of a terminal, comprising,
storing a first packet transmitted between the terminal and a server in a first storage;
storing data required to wake-up the terminal in a second storage;
generating a second packet for keeping connection between the terminal and an access point (AP); and
periodically transmitting the second packet to the AP,
wherein the first storage remains accessible when the terminal is both in a sleep mode and a wake-up mode, the second storage is turned off when the terminal is in the sleep mode, and
wherein the first packet is copied from the second storage when the terminal is in the wake-up mode, and the second packet is generated according to the first packet in the first storage, so that the connection between the terminal and the AP is kept when the terminal is in the sleep mode through the second packet.

6. The operational method according to claim 5, wherein the first packet is stored in the first storage when the terminal receives the first packet from the server at first time.

7. The operational method according to claim 5, wherein the second packet comprises a destination internet protocol address and port information.

8. The operational method according to claim 5, wherein the second packet is generated according to a communication protocol between the terminal and the AP.

* * * * *